United States Patent
Ganesan et al.

(10) Patent No.: US 8,064,436 B2
(45) Date of Patent: *Nov. 22, 2011

(54) SESSION INITIATION PROTOCOL (SIP) MESSAGES INCORPORATING ADDRESS AND/OR ROUTING INFORMATION OBTAINED FROM A CONTACT HEADER OF A REDIRECT MESSAGE

(75) Inventors: Sekar Ganesan, Ocean, NJ (US); Stephanie Parlamas, Colts Neck, NJ (US); Harish Samarasinghe, Holmdel, NJ (US)

(73) Assignee: AT & T Intellectual Property II, L.P., Atlanta, GA (US)

( * ) Notice: Subject to any disclaimer, the term of this patent is extended or adjusted under 35 U.S.C. 154(b) by 1077 days.

This patent is subject to a terminal disclaimer.

(21) Appl. No.: 11/870,208

(22) Filed: Oct. 10, 2007

(65) Prior Publication Data

US 2008/0084874 A1    Apr. 10, 2008

Related U.S. Application Data

(63) Continuation of application No. 10/408,814, filed on Apr. 7, 2003, now Pat. No. 7,283,516.

(51) Int. Cl.
*H04L 12/66* (2006.01)
(52) U.S. Cl. .................. 370/352; 709/228
(58) Field of Classification Search ............. 370/352; 709/227, 228
See application file for complete search history.

(56) References Cited

U.S. PATENT DOCUMENTS

| | | | |
|---|---|---|---|
| 6,038,230 | A | 3/2000 | Ofek |
| 6,161,134 | A | 12/2000 | Wang et al. |
| 6,240,391 | B1 | 5/2001 | Ball et al. |
| 6,259,691 | B1 | 7/2001 | Naudus |
| 6,272,131 | B1 | 8/2001 | Ofek |
| 6,272,132 | B1 | 8/2001 | Ofek et al. |
| 6,330,236 | B1 | 12/2001 | Ofek et al. |
| 6,377,579 | B1 | 4/2002 | Ofek |
| 6,421,674 | B1 | 7/2002 | Yoakum et al. |
| 6,434,143 | B1 | 8/2002 | Donovan |
| 6,438,555 | B1 | 8/2002 | Orton |
| 6,446,127 | B1 | 9/2002 | Schuster et al. |
| 6,477,150 | B1 | 11/2002 | Maggenti et al. |
| 6,480,588 | B1 | 11/2002 | Donovan |
| 6,483,600 | B1 | 11/2002 | Schuster et al. |
| 7,035,248 | B2 | 4/2006 | Wengrovitz |
| 2002/0136206 | A1* | 9/2002 | Gallant et al. ............. 370/352 |
| 2002/0147818 | A1* | 10/2002 | Wengrovitz ............... 709/228 |
| 2005/0165934 | A1* | 7/2005 | Rosenberg et al. ........ 709/227 |

* cited by examiner

*Primary Examiner* — Albert T Chou

(57) ABSTRACT

Session Initiation Protocol (SIP) signaling messages, such as a SIP INVITE message and/or a SIP Redirect message, which are adapted for communicating signaling information between a plurality of network elements located on a multimedia services provider system to set-up a call between at least a first communication device and at least a second communication device of a plurality of communication devices. The SIP INVITE message includes a plurality of address and/or routing information located in a request-URI portion. The SIP Redirect message includes a plurality of address and/or routing information located in a contact header portion.

25 Claims, 2 Drawing Sheets

SESSION INITIATION PROTOCOL (SIP) MESSAGES INCORPORATING ADDRESS AND/OR ROUTING INFORMATION OBTAINED FROM A CONTACT HEADER OF A REDIRECT MESSAGE

This application is a continuation of U.S. patent application Ser. No. 10/408,814, filed on Apr. 7, 2003, now U.S. Pat. No. 7,283,516, entitled SESSION INITIATION PROTOCOL (SIP) MESSAGES INCORPORATING ADDRESS AND/OR ROUTING INFORMATION OBTAINED FROM A CONTACT HEADER OF A REDIRECT MESSAGE (currently allowed), which is incorporated herein by reference.

FIELD OF THE INVENTION

The present invention relates generally to SIP signaling messages adapted to efficiently communicate information between a number of network elements of a communication system, and more specifically, to a SIP Redirect message and a SIP INVITE message, which are each adapted to include a plurality of address and/or routing information, which permits a call control network element and a network routing engine/element to resolve the plurality of address and/or routing information and to set-up a call.

BACKGROUND

Presently, SIP is becoming an increasingly popular protocol for transporting both standard and non-standard information in a common framework over Internet Protocol (IP) based Local Area Networks (LANs), such as systems and services provided by AT&T. However, one drawback to the present SIP protocol is that the headers of SIP messages do not define a standard way to convey addressing and/or routing information.

The addressing and/or routing information is required for setting-up calls and/or for forming a multi-media communication path between a calling communication device and destination communication device. Since the SIP protocol and associated SIP messages do not define the parameters necessary to set-up calls or to form multi-media communication paths between the calling and destination communication devices, SIP cannot provide a standard way for signaling address and/or routing information between core network elements of the IP-based LAN.

Therefore, an unsolved need remains for a SIP protocol that provides SIP signaling messages, which are adapted for carrying address and/or routing related information necessary for providing signaling between core network elements of the IP-based LAN for setting-up calls and/or for forming multi-media communication paths between calling and destination communication devices.

SUMMARY OF THE INVENTION

A method of forming a multi-media communication path between at least a first communication device and at least a second communication device is set forth in accordance with aspects of the present invention. The method includes receiving a request for a multi-media service at a call control element of a multi-media provider system. The call request is processed at the call control element for generating a first SIP INVITE message. The first SIP INVITE message is sent to at least one processor of the multi-media provider system for processing the request for the multi-media service to generate a Redirect message. The Redirect message is received at the call control element and includes a contact header portion including a plurality of routing information used by a network routing element of the multi-media provider system to couple at least the first communication device to the second communication device.

The method further includes receiving the Redirect message at the call control element. The Redirect message is processed at the call control element for generating a second INVITE message. In generating the second INVITE message, the call control element maps the plurality of routing information from the Redirect message to the second INVITE message and provides the second INVITE message to a network routing element.

In one aspect, mapping the plurality of routing information includes concatenating the plurality of routing information to a request-universal resource indicator (URI) located in a header portion of the second INVITE message. Concatenating the plurality of routing information to the request-URI includes providing Primary Routing Address information in the request-URI of the second INVITE message, as well as Primary Routing Address-Nature of Number information, Primary Routing Address-Numbering Plan information, Call Party Station Type information, Carrier Identification Code information, Nature of Carrier information, Carrier Usage information and User information.

In another aspect of the present invention, a SIP Redirect message is set forth, which is adapted to communicate predetermined signaling information between a plurality of network elements of a system. The SIP Redirect message includes a header portion having at least a Contact header field including a plurality of routing information used by a network routing element of the plurality of network elements to couple at least a first communication device to a second communication device.

In one aspect, the plurality of routing information includes one or more of Primary Routing Address information, Primary Routing Address-Nature of Number information, Primary Routing Address-Numbering Plan information, Call Party Station Type information, Carrier Identification Code information, Nature of Carrier information, Carrier Usage information and User information.

In another aspect of the present invention, a SIP INVITE message is set forth, which is adapted to communicate predetermined signaling information between a plurality of network elements of a communication system. The SIP INVITE message includes at least a header portion having at least an INVITE header field including a plurality of routing information. The plurality of routing information may be used by a network routing element of the plurality of network elements to couple at least a first communication device to a second communication device.

In one aspect, the plurality of routing information includes one or more of Primary Routing Address information, Primary Routing Address-Nature of Number information, Primary Routing Address-Numbering Plan information, Call Party Station Type information, Carrier Identification Code information, Nature of Carrier information and Carrier Usage information.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

In accordance with principles of the present invention, set forth is a SIP Redirect message (hereinafter referred to as a "Redirect message") and a SIP INVITE message (hereinafter referred to as an "INVITE message"), which each include predetermined content and format adapted for communicating address and/or routing information between various elements of a communications system, such as a multi-media services provider system 10a, as will be described in detail below in connection with FIGS. 1 and 2.

Figure 1:
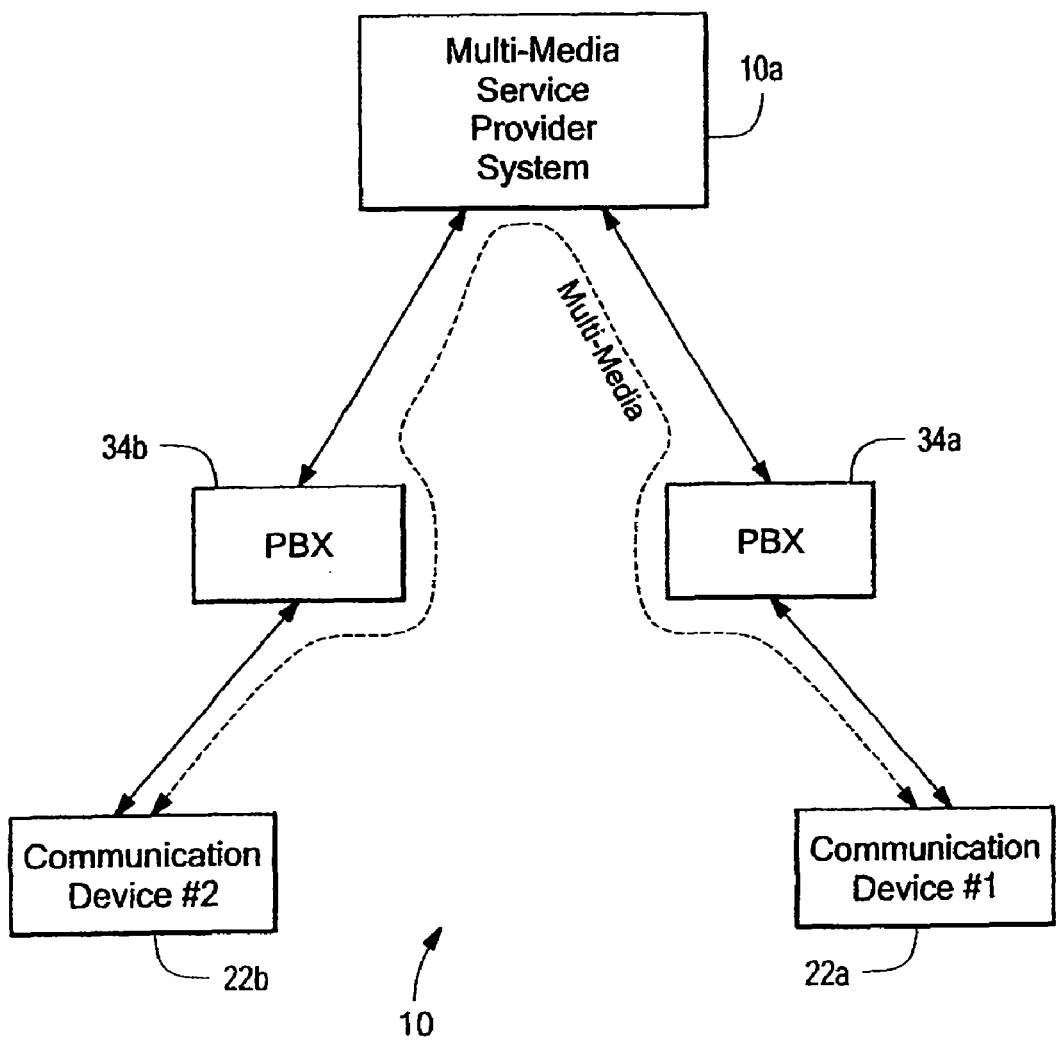
FIG. 1 is an exemplary high-level schematic block diagram of a system for providing multi-media communications between a plurality of communication devices according to the present invention.

Referring now to FIG. 1, shown is one embodiment of a communication network 10 for providing multi-media communications between at least first 22a and second 22b communication devices of a plurality of communication devices, in accordance with the present invention. The communication network 10 includes the multi-media provider system 10a, which is operative to provide a plurality of multi-media services to the first 22a and second 22b communication devices, via respective first 34a and second 34b SIP-enabled IP-Private Branch Exchanges (hereinafter referred to as "PBXs"). It should be understood that the multi-media services provider system 10a is additionally operative to provide a plurality of multi-media services to a plurality of other communication devices not specifically shown herein.

Figure 2:
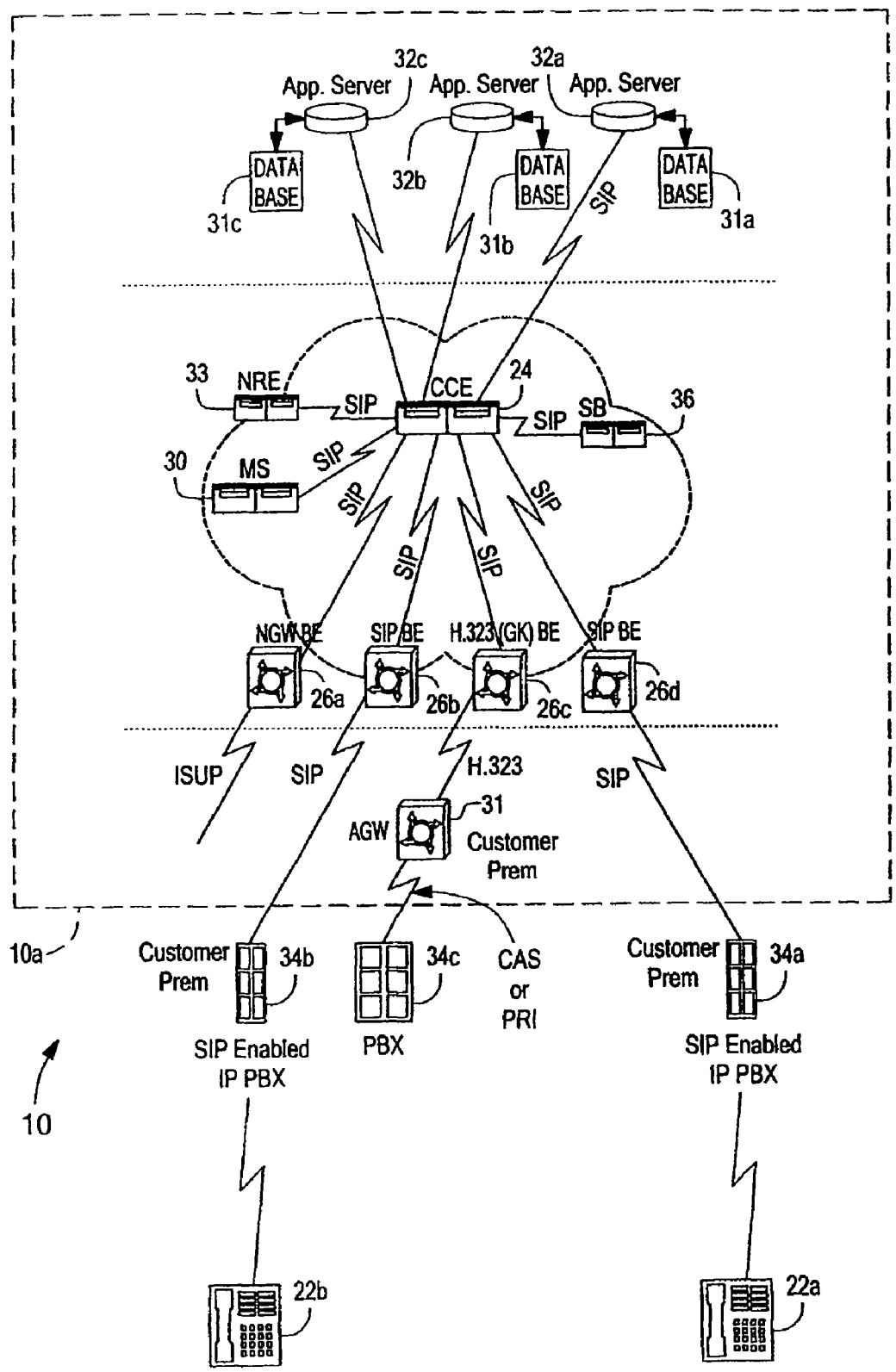
FIG. 2 is an expanded schematic block diagram of the system shown in FIG. 1.

Referring to FIG. 2, in the exemplary embodiment, the multi-media services provider system 10a includes a centrally located Call Control Element 24 (CCE), a Media Server (MS) 30, a plurality of Application Servers (ASs) 32a, 32b, 32c (collectively referred to hereinafter as ASs 32a-32b) at least one Network Routing Engine (NRE) 33, at least one Service Broker (SB) 36 and a plurality of Border Elements (BEs) 26a, 26b, 26c, 26d (collectively referred to hereinafter as BEs 26a-26d). The CCE 24 is coupled to the plurality of ASs 32a-32c, to the plurality of BEs 26a-26d and to the MS 30. The CCE is further coupled to the NRE 33 and to the SB 36.

In the exemplary embodiment, the fourth BE 26d is coupled to the first PBX 34a and the second BE 26b is coupled to the second PBX 34b. Further, the third BE 26c is coupled to the third PBX 34c, via an access gateway 31, and is adapted for operation using the H.323 protocol. It should be understood that the BEs 26a-26d can be coupled to a plurality of other PBXs (not shown), which are included in other embodiments not specifically shown herein.

In the exemplary embodiment, the first PBX 34a is coupled to the first communication device 22a. Further, the second PBX 34b is similarly coupled to the second communication device 22b.

The CCE 24, for example, can be provided by Lucent Corporation of Murray Hill, N.J. The CCE 24 may be defined as a back-to-back user agent (B2BUA), which operates to receive a plurality of INVITE messages from any one of the plurality of BEs 26a-26d and upon receipt of the plurality of INVITE messages from the plurality of BEs 26a-26d, the CCE 24 can initiate an equal plurality of INVITE messages to the SB 36. The CCE 24 is further adapted to receive a plurality of Redirect messages from the SB 36 in response to the plurality of INVITE messages sent to the SB 36 from the CCE 24. When the CCE 24 receives a Redirect message back from the SB 36 in response to an INVITE message and depending on instructions provided by the SB 36 in the Redirect message, the CCE 24 can either send an INVITE message to one or more of the plurality of ASs 32a-32c for feature processing for the call or the CCE 24 can send an INVITE message to the NRE 33 (i.e. feature processing is not required for the call) to bypass the plurality of ASs 32a-32c and set up the call. The CCE 24 is further adapted to maintain the call state between the first 22a and the second 22b communication devices and to generate a call detail record (CDR) based on instructions received from any one or more of the plurality of ASs 32a-32c.

The CCE 24 is also adapted to use "Third Party Call Control," which is described in the reference, "Third Party Call Control in SIP" by Rosenberg, Peterson, Schulzrinne, Camarillo, RFC-Draft, Internet Engineering Task Force, Mar. 2, 2001," which is herein incorporated by reference. The Third Party Call Control feature of the CCE 24, permits the CCE 24 to create a call in which communication is actually between other parties. For example, an operator can use Third Party Call Control to create a call that connects two participants together or similarly, the CCE 24 can use Third Party Call Control to connect the MS 30 and the first communication device 22a. Generally, Third Party Call control allows the CCE 24 to connect the various end callers without having the media stream pass through the CCE 24 and yet, the CCE 24 can still maintain call state information.

In the exemplary embodiment, the plurality of BEs 26a-26d can be provided by Lucent Corporation of Murray Hill, N.J. In one embodiment, the plurality of BEs 26a-26d are adapted to use SIP as the signaling protocol for interfacing with the CCE 24. Further the first BE 26a is adapted to interface to a circuit network (not shown) using an ISDN user port included thereon. The second BEs 26b and the fourth 26d are adapted to use SIP as the signaling protocol for interfacing with the first 34a and second 34b PBXs, respectively. The third BE 26c is adapted to use H.323 as the signaling protocol for interfacing with the PBX 34c, via the Access Gateway (AGW) 31. In the exemplary embodiment, the plurality of BEs 26a-26d may be thought of as a SIP B2BUA because each of the BEs 26a-26d generates SIP messages as well as receives requests from SIP endpoints, such as the SIP-enabled first 34a and second 34b PBXs, and either processes the requests itself or forwards the requests to the CCE 24 for processing.

In the exemplary embodiment, the SB 36 can also be provided by Lucent Corporation of Murray Hill, N.J. In one embodiment, the SB 36 acts as the SIP Redirect Server. The SB 36 operates to identify a particular service request, which is included in the INVITE message received at the SB 36 from the CCE 24. The SB further operates to instruct the CCE 24, via a Redirect message, to redirect the call to one or more of the plurality of ASs 32a-32c for service processing. In an embodiment, the SB 36 can identify a particular service requested by the call based on ANI or DN information included in the INVITE message received at the SB 36 from the CCE 24. In addition, the SB 36 may perform call screening based on the Charge Party Station Type or OLI received in the INVITE message at the SB 36.

After the SB 36 determines which of the first AS 32a, second AS 32b or third AS 32c as the primary and secondary processors for processing a particular call request, the SB 36 generates a Redirect message and populates the IP address/Port number combinations of the (primary/secondary) AS 32a, 32b or 32c in the Contact headers of the Redirect message, and sends it to the CCE 24. This approach permits the CCE 24 to query the secondary AS 32a, 32b or 32c in the event that the primary AS 32a, 32b or 32c is overloaded or not available to process the call request. If the SB 36 does not find a ANI or Dialed number match in the INVITE message received from the CCE 24, but has a carrier other than the multi-media service provider system 10a (e.g. AT&T), the SB 36 may send another Redirect message to the CCE 24 with the IP address of the NRE 33 indicating that the call request does not require AS 32a-32c processing, which effectively bypasses any service processing at the plurality of ASs 32a-32c.

In the exemplary embodiment, the plurality of ASs 32a-32c can each include a conventional computer server, such as an "NT-Server," which can be provided by Microsoft of Richmond, Wash. or a "Unix Solaris Server," which can be provided by Sun Micro Systems of Palo Alto, Calif. The ASs 32a-32c can be programmed with conventional Web-page interface software such as: "Visual Basic," "Java," "JavaScript," "HTML/DHTML," "C++," "J+," "Perl," or "Perlscript," and "ASP." The ASs 32a-32c can each further be programmed with an operating system, Web server software and Web Application software, such as an e-commerce application and computer network interface software.

In addition, the ASs 32a-32c contain the intelligence needed for offering multimedia services such as Toll-Free Calling or 800-Service, Virtual Private Networks, and various multimedia features like email, "Click-To-Dial." In an embodiment, the intelligence may include customer logic and data, as well as, common logic and data that may be used by all customers. It may be necessary for the CCE 24 to access the logic and data in the ASs 32a-32c in order to provide the multi-media services or features.

The ASs 32a-32c can each be further respectively coupled to databases 31a-31c, which each contain a service intelligence layer adapted for providing the plurality of multi-media services described above. The intelligence layer may include customer logic and data, as well as common logic and data that is used by communication devices 22a, 22b, as well as a plurality of other communication devices not specifically shown in FIG. 2.

The NRE 33 also operates as a SIP Redirect Server. The NRE 33 processes INVITE messages received from the CCE 24; performs address resolution based on the routing number returned from the AS 32a-32c and generates a Redirect message. The NRE 33 populates the Redirect message with the IP addresses of one or more destination BEs 26a-26d and sends the Redirect message to the CCE 24. In an embodiment, the NRE 33 can send the Redirect message to the CCE 24 with a predetermined hierarchical list of IP addresses corresponding to a predetermined hierarchical order of BEs 26a-26d for processing the call. In this arrangement, a highest level BE 26a, 26b, 26c or 26d defined on the list can receive and process the call and if the highest level BE 26a, 26b, 26c or 26d is unable to process the call or has insufficient resources to do so, the call may be redirected by the CCE 24 to a next successive BE 26a, 26b, 26c or 26d defined on the hierarchical list.

The first 22a and second 22b communication devices can include a plurality of SIP-enabled devices, such as telephones, personal computers and IP-Private Branch Exchanges ("PBXs"). In addition, the first 22a and second 22b communication devices can include a plurality of SIP-enabled wireless devices, such as cellular telephones, pagers and personal digital assistants ("PDAs").

The MS 30 of the exemplary embodiment, is constructed and arranged to provide a plurality of predetermined announcements to the communication devices 22a, 22b and to collect information from the communication devices 22a, 22b (e.g. caller-entered data). For example, if the caller is required to enter digits or a phrase for a Call Prompter service or SDN (Software Defined Network) service, the MS 30 will play the announcement prompting the caller to enter the required information. The MS 30 also collects the information entered by the caller. The MS 30 plays the announcements to the caller based on the instructions and announcement ID provided in the second INVITE message. In one embodiment, the announcements can include "Service Terminating" announcements or announcements for the caller to enter an authorization code, account code, or "call-prompter" digits.

In an exemplary embodiment, the MS 30 can be defined as a VoiceXML based MS 30. The MS 30 provides various announcements and collects various information from callers operating from communication devices 22a or 22b when features requiring caller interaction are required to complete a call. For example, if the caller must enter digits or a phrase for a Call Prompter service or SDN service, which can be provided by the multi-media services provider system 10a, the MS 30 will play the announcement prompting the caller to enter the required information. The MS 30 further collects the information entered by the caller, which is defined herein as "caller-entered data."

As described above, the CCE 24 is adapted to receive a call request or INVITE message from the first 22a and/or second 22b communication devices, which requests multi-media services. In response, the CCE 24 can communicate with any one or more of the SB 36, the plurality of application servers 32a-32c, the NRE 33 and/or the plurality of BEs 26a-26d using a number of predetermined INVITE messages.

In one exemplary embodiment, the predetermined INVITE message can include the following information:

INVITE    sip:7324204563@sdnas.att.com;user=phone SIP/2.0
Via: SIP/2.0/UDP att.com:5060
Max-Forwards: 70
From:    sip:7324204699@att.com;    cn=7324201000; cn-non=3; cn-np=1; cpst=32
To:    <sip:7324204563@att.com>;    ca=7324204563; ca-non=3; ca-np=1; cic=288; cs=1; noc=0
Call-ID: c3904563-3119a-2995c 2e322238@att.com
CSeq: 100 INVITE
Accept: application/vnd.att-advanced-intelligent-services
Contact: sip:7324204699@att.com:5060
Content-Length: 0 where the above-described "From:" header field includes the header parameters: cn, cn-non, cn-np, and cpst; and where the above-described "To:" header field includes the header parameters: ca, ca-non, ca-np, cic, and cs, which are all defined below in the following table along with additional header parameters.

| Field | Name |
|---|---|
| cn | Charge Number (digits) |
| cn-non | Charge Number, Nature of Number |
| cn-np | Charge Number, Numbering Plan |
| ca | Collected Address (i.e. digits of dialed number) |
| ca-non | Collected Address, Nature of Number |
| ca-np | Collected Address, Numbering Plan |
| cpn | Calling Party Number |
| cpn-non | Calling Party Number, Nature of Number |
| cpn-np | Calling Party Number, Numbering Plan |
| cpn-pri | Calling Party Number, Privacy Restriction Indicator |
| cpn-si | Calling Party Number, Screening Indicator |
| cic | Carrier Identification Code (digits) |

-continued

| Field | Name |
|---|---|
| cs | Carrier Selection |
| noc | Nature of Carrier |
| cpst | Charge Party Station Type |
| cu | Carrier Usage |

In the exemplary embodiment of the predetermined INVITE message, the "From:" and the "To:" header fields are located in a header region of the INVITE message. In this arrangement, a recipient network device (e.g. ASs 32a-32c) can rapidly parse and/or process the INVITE message to read pertinent addressing information contained in the header region of the INVITE message without having to also open and parse and/or process the body portion of the INVITE message to read the pertinent addressing information.

The header parameters of the "To:" header field (e.g. ca, ca-non, ca-np, cic, and cs) and the header parameters of the "From:" header field (e.g. cn, cn-non, cn-np, and cpst) of the INVITE message follow a name value pair convention. This allows the header parameters of the "To:" and "From:" header fields to be placed in any order in the header region of the INVITE message. A number of the header parameters follow a format that closely resembles a format used by the American National Standards Institute (ANSI) signaling standards. This facilitates inter-working between the SIP-based multi-media services provider system 10a and other ANSI-based circuit networks (not shown). In addition, using this format facilitates the transmission of information between network elements and support systems that are based on ANSI-based standards.

The Charge Number (e.g. cn) header parameter contains the charge number of the calling or originating party and other associated header parameters, such as the Nature of Number (e.g. cn-non) and the Numbering Plan (cn-np). In this exemplary embodiment, the Charge Number header parameter is positioned after the URI in the "From:" header field of the INVITE message. The Charge Number header parameter follows the SIP-Digits format, which closely resembles the format used by ANSI signaling standards. This facilitates inter-working between the SIP-based IP network and the ANSI-based circuit network.

The CCE 24 is adapted to receive and process a number of incoming INVITE messages, which are received from various elements of the multi-media provider system 10a or from other devices and/or network elements. For example, the CCE 24 can receive an INVITE message from any one of the plurality of BEs 26a-26d. The CCE 24 is also adapted to process the number of INVITE messages received from the plurality of BEs 26a-26d, as described above, to generate a number outgoing INVITE messages. The number of outgoing INVITE messages can be communicated from the CCE 24 to any one or more of a number of network elements, such as the SB 36, the MS 30, the plurality of ASs 32a-32c and/or the NRE 33.

When the CCE 24 receives an incoming INVITE message from a SIP/H.323 BE, such as the third BE 26c, the CCE 24 populates the Charge Number header parameter in the outgoing INVITE message with the Charge Number provisioned in the CCE 24 for the originating facility. When the CCE 24 receives an incoming INVITE message from a Network Gateway BE, such as the first BE 26a, the CCE 24 uses the Charge Number parameter from the Multipurpose Internet Mail Extensions (MIME) encoded SIP-Telephony (SIP-T) message to populate the Charge Number header parameter for an outgoing INVITE message, which is generated by the CCE 24. If the CCE 24 receives a Redirect message from one or more of the ASs 32a, 32b or 32c, and the CCE 24 determines that the content of the Redirect message should be communicated to the NRE 33, the CCE 24 sends the Charge Number header parameter in an outgoing INVITE message to the NRE 33, which outgoing INVITE message is generated by the CCE 24.

If the CCE 24 receives a Redirect message from the NRE 33 and the CCE 24 determines that the content of the Redirect message should be communicated to the third BE 26c, for example, the CCE 24 operates to generate an outgoing INVITE message with the Charge Number parameter removed. The CCE 24 removes the Charge Number header parameter from the outgoing INVITE message, which is sent to the third BE 26c, because the Change Number is used only in the service provider's network.

If any one of the plurality of ASs 32a, 32b or 32c receives an INVITE message from the CCE 24, which includes the Charge Number header parameter, the AS 32a, 32b or 32c will map the value in the Charge Number header parameter to a pre-defined variable (e.g. a system variable used by the application logic) for the Charge Number. This includes mapping the Nature of Number and Numbering Plan Type header parameters to the related pre-defined variable for the Charge Number header parameter.

The Carrier Identifier Code (e.g. CIC) is a header parameter located in the To: header after the Collected Address (ca) header parameter and contains the Carrier of the session. The Carrier Identifier Code may be defined as the input entered by the Calling or Originating Party; or the Carrier Identifier Code may be predefined and set by the network elements such as the CCE 24 or the AS 32a, 32b or 32c.

The Carrier Identifier Code header parameter can include the following information and/or format:

Carrier Selection (cs):
0=No indication
1=Selected carrier identification code pre-subscribed and not input by calling party
2=Selected carrier identification code pre-subscribed and input by calling party
3=Selected carrier identification code pre-subscribed, no indication of whether input by calling party
4=Selected carrier identification code not pre-subscribed and input by calling party Carrier Digits (cic):
A 4 digit integer.

Nature of Carrier (noc):
0=No Nature of Carrier Provided
1=Local
2=IntraLATA toll
3=InterLATA
4=Local, intraLATA toll and interLATA
5=Local and intraLATA toll
6=IntraLATA toll and interLATA When the CCE 24 receives an INVITE message from a SIP/H.323 BE, such as the third BE 26c, the CCE 24 populates the Carrier header parameter in the outgoing INVITE with the Carrier parameter provisioned in the CCE 24 for the originating facility or office-wide basis. When the CCE 24 receives the INVITE message from a Network Gateway BE, such as the first BE 26a, the CCE 24 will use the Carrier header parameter from a MIME encoded SIP-T message to populate the Carrier header parameter of the outgoing INVITE message.

If the CCE 24 receives a Redirect message from any one of the plurality of ASs 32a-32c and the CCE 24 determines that the contents of the Redirect message should be forwarded to the NRE 33, the CCE 24 sends the Charge Number header parameter in an outgoing INVITE message to the NRE 33. If the CCE 24 receives a Redirect message from the NRE 33 and the CCE 24 determines that the contents of the Redirect message should be forwarded to the third BE 26c, for example, the CCE 24 removes the Charge Number header parameter from the INVITE message, which is generated by the CCE 24 and sends the INVITE message to the third BE 26c.

The Charge Party Station Type header parameter (e.g. cpst) contains information about the Calling Party Station, such as whether the calling party station is a pay-phone, hotel phone, etc. The Charge Party Station Type header parameter is also referred to as the Originating Line Information (OLI) within the Integrated Services Digital Network User Part (ISUP) protocol. The Charge Party Station Type header parameter is located in the "From:" header of the INVITE message after the Charge Number-Number Plan header parameter (e.g. cn-np). The Charge Party Station Type header parameter may include one of the following values and corresponding definitions:

0=Identified Line—No Special Treatment
1=ONI (Multiparty)
2=ANI Failure (unavailable)
3=Hotel (without room identification)
4=Coinless, Hospital, Inmate, etc.
5=InterLATA Restricted
6=AIOD—Listed DN sent
7=Identified Line (coin or no coin)
8=Coin call
9=AIN
10=InterLATA restricted—Hotel line
11=InterLATA restricted—Coinless line, etc.
12=Test Call The Collected Address header parameter contains the destination that the Calling or Originating Party wants to connect and its associated parameters, such as Nature of Number and Numbering Plan. In telephony terms, this contains the dialed number or the Collected Address Information. The Collected Address header parameter follows the SIP-Digits format, which closely resembles the format used by ANSI signaling standards. This facilitates inter-working between the SIP-based IP network and the ANSI-based circuit network.

In an embodiment, after processing the above-described INVITE message at one or more of the plurality of application servers 32a-32c, the one or more of the plurality of application servers 32a-32c can generate and send a Redirect message the CCE 24, which instructs the CCE 24 to set up the call request, as described above. In one exemplary embodiment, the Redirect message generated by the one or more of the plurality of application servers 32a-32c and sent to the CCE 24 can include at least the following information:

SIP/2.0 302 Moved
Via SIP/2.0/UDP cce.att.com;com:5060
Max-Forwards: 50
From: sip:732.420.4699@att.com;cn=7324201000;cn-non=3;cn-np=1; cpst=32
To: <sip: 732.420.4563@att.com>;ca=7324204563;ca-non=3;ca-np=1;cic=288;cs=1;noc=0
Call-ID: c3904563-3119a-2995c 2e322238@att.com
CSeq: 100 INVITE
Contact: sip: 732.420.4563@nre.att.com;pra=2225554563;pra-non=1;pra-np=1;cpst=32
cic=0288;cs=1;noc=0; cu=1;user=phone SIP 2.0

Content-Type: multipart/mixed; boundary="- - att-advanced-services - -"
Content-Length: nnn
MIME-Version: 1.0
- - att-advanced-services
Content-Type: application/SDP
v=0
o=hs 2890844526 2890842807 IN IP4 126.16.64.4
s=IP to IP test call
c=IN IP4 mypc.att.com
t= 2873397496 2873404696
m=audio 2238 RTP/AVP 0
a=rtpmap:0 PCMU/8000
- - att-advanced-services
Content-Type: application/vnd.att-advanced-services
Content-Disposition: session
beid=be
l=222
arc=408, 486
r=
999000123;878c045c1c876c00000cffffff827c008c1c010c0007324204000; 129
- - att-advanced-services - -

The above-described Redirect message includes a Contact header having a Request-URI followed by a plurality of address and/or routing information. In an embodiment, the plurality of address and/or routing information can include: Primary Routing Address (pra), Primary Routing Address-Nature of Number (pra-non); Primary Routing Address-Numbering Plan (pra-np); Call Party Station Type (cpst); Carrier Identification Code (cic); Carrier Selection (cs); Nature of Carrier (noc); Carrier Usage (cu) and User. In an embodiment, the plurality of address and/or routing information can include the following values and/or characters: pra=2225554563; pra-non=1; pra-np=1; cpst=32 cic=0288; cs=1; noc=0; cu=1;user=phone SIP 2.0.

The CCE 24 can receive and process the above-described Redirect message to generate an INVITE message, which is sent to the NRE 33. The INVITE message includes the plurality of address and/or routing information mapped from the Redirect message. In one exemplary embodiment, the INVITE message provided to the NRE 33 can include at least the following information:

INVITE sip: 732.420.4563@nre.att.com;pra=2225554563;pra-non=1;pra-np=1;cpst=32
cic=0288;cs=1;noc=0; cu=1;user=phone SIP 2.0
Via: SIP/2.0/UDP att.com:5060
From: sip:732.420.4699@att.com;
To: <sip: 732.420.4563@att.com>;
Call-ID: c3904563-3119a-2995c 2e322238@att.com
CSeq: 100 INVITE
Contact: sip:732.420.4699@att.com:5060
Content-Type: multipart/mixed; boundary="- - att-advanced-services - -"
Content-Length: nnn
MIME-Version: 1.0
- - att-advanced-services
Content-Type: application/SDP
v=0
o=hs 2890844526 2890842807 IN IP4 126.16.64.4
s=IP to IP test call
c=IN IP4 mypc.att.com
t= 2873397496 2873404696
m=audio 2238 RTP/AVP 0
a=rtpmap:0 PCMU/8000
- - att-advanced-services
Content-Type: application/vnd.att-advnced-services
Content-Disposition: session
beid=be
l=222
arc=408, 486

-continued

```
r=
999000123;878c045c1c876c00000cffffff827c008c1c010c0007324204000;
129
- - att-advanced-services - -
```

The above-described INVITE message sent to the NRE 33 can include instructions to resolve the plurality of address and/or routing information and to set-up the call request. In generating the INVITE message at the CCE 24, the CCE 24 maps the plurality of address and/or routing information contained in the Contact header portion of the Redirect message, which was received from the AS 32*a*, 32*b* or 32*a*, to the Request URI of the INVITE header portion of the INVITE message.

More specifically, the plurality of address and/or routing information is populated into the INVITE header portion of the INVITE message immediately after or concatenated to the Request-URI (e.g. 732.420.4563@nre.att.com) information. As shown above in the exemplary embodiment of the INVITE message, the plurality of address and/or routing information can include: pra=2225554563; pra-non=1; pra-np=1;cpst=32; cic=0288; cs=1;noc=0; cu=1; user=phone SIP 2.0, all of which has been mapped from the Contact header portion of the Redirect message received from the AS 32*a*, 32*b* or 32*c*.

It should be understood that the coding values and/or characters associated with each of the plurality of address and/or routing information, as shown herein, are for illustrative purposes and it should be realized that a plurality of other coding values can be associated with each of the plurality of address and/or routing information. It should also be understood that a number of other Redirect messages (not shown), which are similarly constructed and arranged as the Redirect message described above, can also be received at the CCE 24 from other elements of the multi-media provider system 10*a*. For example, if the CCE 24 receives a Redirect message from the SB 36, the CCE 24 can map a plurality of address and/or routing information from the Contact header portion of the Redirect message to the Request URI of an INVITE header portion of another embodiment of the INVITE message, in a similar manner as that described above. Subsequently, the CCE 24 can send the other embodiment of the INVITE message to the NRE 33 for address resolution and to set-up the call request.

In a further example, if the CCE 24 receives a call request or INVITE message from a Network Gateway Border Element (e.g. NGBE 26*a*), the CCE 24 can open a MIME ISUP portion of the message body, and map all address and/or routing information from the MIME ISUP portion of the message body to an INVITE header portion of yet another embodiment of the INVITE message. Thereafter, the yet other embodiment of the INVITE message can be sent to the NRE 33 for address resolution and to set-up the call request.

While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto. All references and publications cited herein are expressly incorporated herein by reference in their entirety.

What is claimed is:

1. A method of forming a multi-media communication path between a first communication device and a second communication device, comprising:
   receiving a request for a multi-media service at a call control element of a multi-media provider system;
   processing the request at the call control element for generating a first invite message;
   sending the first invite message to a processor of the multi-media provider system for processing the request for the multi-media service to generate a redirect message; and
   receiving the redirect message at the call control element, wherein the redirect message includes a contact header portion including a plurality of routing information in each of a to: field and a from: field of the contact header portion used by a network routing element of the multi-media provider system to establish the multi-media communication path between the first communication device to the second communication device.

2. The method of claim 1, further comprising:
   processing the redirect message at the call control element for generating a second invite message, wherein generating the second invite message comprises mapping the plurality of routing information from the redirect message to the second invite message and providing the second invite message to the network routing element.

3. The method of claim 2, wherein the mapping the plurality of routing information comprises concatenating the plurality of routing information to a request-universal resource indicator located in a header portion of the second invite message.

4. The method of claim 3, wherein the concatenating the plurality of routing information comprises providing primary routing address information in the request universal resource indicator of the second invite message.

5. The method of claim 4, wherein the concatenating the routing information comprises providing primary routing address-nature of number information in the request universal resource indicator of the second invite message.

6. The method of claim 5, wherein the concatenating the routing information comprises providing primary routing address-numbering plan information in the request universal resource indicator of the second invite message.

7. The method of claim 6, wherein the concatenating the routing information comprises providing call party station type information in the request universal resource indicator of the second invite message.

8. The method of claim 1, wherein the first invite message and the redirect message are session initiation protocol invite message and session initiation protocol redirect message, respectively.

9. A device for generating a session initiation protocol redirect message adapted to communicate predetermined signaling information between a plurality of network elements of a system, the session initiation protocol redirect message comprising a header portion having at least a contact header field including a plurality of routing information used by a network routing element of the plurality of network elements to establish a multi-media communication path between a first communication device to a second communication device.

10. The device of claim 9, wherein the plurality of routing information comprises primary routing address information.

11. The device of claim 10, wherein the plurality of routing information further comprises primary routing address-nature of number information.

12. The device of claim 11, wherein the plurality of routing information further comprises primary routing address-numbering plan information.

13. The device of claim 12, wherein the plurality of routing information further comprises call party station type information.

14. The device of claim 13, wherein the plurality of routing information further comprises carrier identification code information.

15. The device of claim 14, wherein the plurality of address routing information further comprises nature of carrier information.

16. The device of claim 14, wherein the plurality of routing information further comprises carrier usage information.

17. The device of claim 14, wherein the plurality of routing information further comprises user information.

18. A computer readable medium having a session initiation protocol invite message adapted to communicate predetermined signaling information between a plurality of network elements of a communication system, the session initiation protocol invite message comprising at least a header portion having at least an invite header field including a plurality of routing information used by a network routing element of the plurality of network elements to establish a multi-media communication path between a first communication device to a second communication device.

19. The computer readable medium of claim 18, wherein the plurality of routing information comprises primary routing address information.

20. The computer readable medium of claim 19, wherein the plurality of routing information further comprises primary routing address-nature of number information.

21. The computer readable medium of claim 20, wherein the plurality of routing information further comprises primary routing address-numbering plan information.

22. The computer readable medium of claim 21, wherein the plurality of routing information further comprises call party station type information.

23. The computer readable medium of claim 22, wherein the plurality of routing information further comprises carrier identification code information.

24. The computer readable medium of claim 23, wherein the plurality of routing information further comprises nature of carrier information.

25. The computer readable medium of claim 24, wherein the plurality of routing information further comprises carrier usage information.

* * * * *